(12) United States Patent
Dietrich

(10) Patent No.: US 10,073,206 B2
(45) Date of Patent: Sep. 11, 2018

(54) APPARATUS FOR CONNECTING A FIBER OPTIC OR RIGID LIGHT GUIDE TO A LIGHT SOURCE

(71) Applicant: SCHOTT AG, Mainz (DE)

(72) Inventor: Andreas Dietrich, Guldental (DE)

(73) Assignee: SCHOTT AG, Mainz (DE)

( * ) Notice: Subject to any disclaimer, the term of this patent is extended or adjusted under 35 U.S.C. 154(b) by 291 days.

(21) Appl. No.: 14/845,460

(22) Filed: Sep. 4, 2015

(65) Prior Publication Data

US 2016/0070048 A1 Mar. 10, 2016

(30) Foreign Application Priority Data

Sep. 5, 2014 (DE) .................. 10 2014 217 826

(51) Int. Cl.
*F21V 8/00* (2006.01)
*F21K 99/00* (2016.01)
*G02B 6/42* (2006.01)

(52) U.S. Cl.
CPC ......... *G02B 6/0006* (2013.01); *G02B 6/4292* (2013.01); *G02B 6/4298* (2013.01)

(58) Field of Classification Search
CPC .... F21Y 2115/10; F21Y 2103/10; F21K 9/00; F21K 9/20; F21K 9/62; F21V 7/0008
See application file for complete search history.

(56) References Cited

U.S. PATENT DOCUMENTS

| | | | |
|---|---|---|---|
| 4,737,008 A | 4/1988 | Ohyama et al. | |
| 4,758,719 A | 7/1988 | Sasaki et al. | |
| 5,163,109 A * | 11/1992 | Okugawa | B24B 19/226 385/88 |
| 5,649,039 A * | 7/1997 | Benzoni | G02B 6/3855 385/78 |
| 6,409,391 B1 * | 6/2002 | Chang | G02B 6/3825 385/115 |
| 6,626,582 B2 * | 9/2003 | Farrar | G02B 6/3825 385/53 |
| 2007/0019694 A1 | 1/2007 | Miura | |
| 2011/0103757 A1 | 5/2011 | Alkemper et al. | |
| 2011/0182552 A1 | 7/2011 | Russert et al. | |

FOREIGN PATENT DOCUMENTS

| | | |
|---|---|---|
| DE | 202008011063 U1 | 12/2009 |
| DE | 102008044938 B4 | 10/2013 |
| EP | 1284428 A2 | 2/2003 |
| GB | 2233787 A | 1/1991 |
| WO | 2009100834 A1 | 8/2009 |

\* cited by examiner

*Primary Examiner* — Elmito Breval
(74) *Attorney, Agent, or Firm* — Ohlandt, Greeley, Ruggiero & Perle, L.L.P.

(57) ABSTRACT

A system and an apparatus for connecting a fiber optic or rigid light guide to a light source are provided. The fiber optic or rigid light guide has one end connected to a ferrule with a contact surface. The system includes a connecting element connectable to the light source, into which the ferrule can be inserted. The connecting element has a number of radially movable fastening portions, wherein the fixing portions are radially biased and cooperate with the contact surface, when the ferrule is inserted into the connecting element, whereby a first retention force is applied to the contact surface, and a fixing element is positioned in such a way that it cooperates with the fastening portions so that a second retention force, which is greater than the first retention force, is applied to the contact surface.

18 Claims, 6 Drawing Sheets

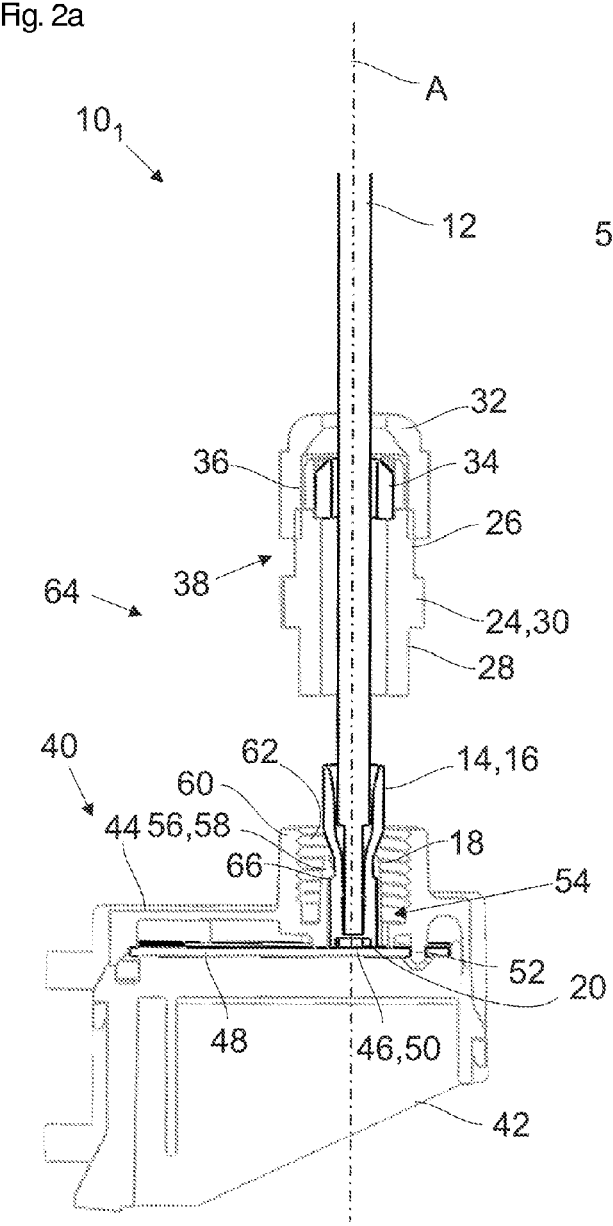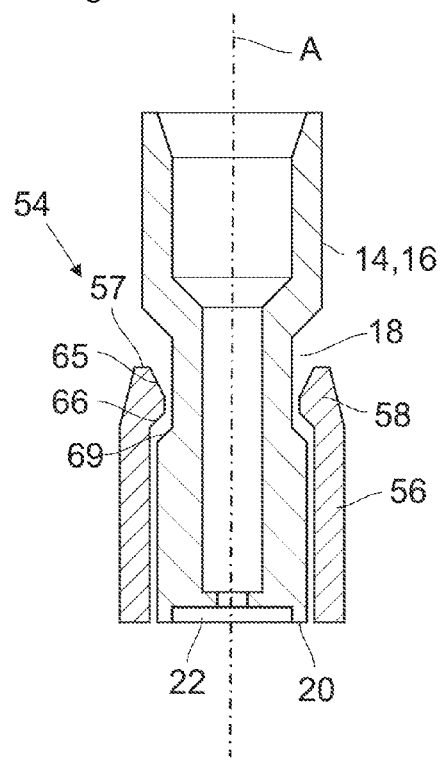
Fig. 2a
Fig. 2b

APPARATUS FOR CONNECTING A FIBER OPTIC OR RIGID LIGHT GUIDE TO A LIGHT SOURCE

CROSS REFERENCE TO RELATED APPLICATIONS

This application claims benefit under 35 U.S.C. § 119(a) of German Patent Application No. 10 2014 217 826.6 filed Sep. 5, 2014, the entire contents of which are incorporated herein by reference.

BACKGROUND

1. Field of the Invention

The present invention relates to an apparatus and a method for connecting a fiber optic or rigid light guide to a light source, wherein one end of the fiber optic or rigid light guide is connected to a ferrule which comprises a contact surface.

2. Description of Related Art

Fiber optic or rigid light guides are used to guide light provided by a light source to a fiber optic component even over longer distances, which may be several meters. Fiber optic light guides are described in detail in WO 2009/100834 A1. Fiber optic components may be lighting devices of all kinds, which should illuminate an object in any form. At this point lighting devices for vehicles should be mentioned exemplarily, by means of which, for example, running boards of SUVs or off-road vehicles can be illuminated (see DE 20 2008 011 063 U1), wherein also so-called sidelights, i.e. laterally radiating elements may be used.

In order to be able to provide a sufficient illuminance in the lighting device it is of great importance that the light is coupled correctly into the light guide at the end of the fiber optic or rigid light guide facing to the light source. As can be extracted, for example, from WO 2009/100834 A1 the fiber optic light guides include a plurality of glass fibers, which are bundled at the respective ends by means of a sleeve (see also DE 10 2008 044 938 B4) which in conjunction with fiber optic light guides are also denoted as ferrules. US 2007/0019694 A1 describes a laser module by means of which one or more laser beams can be coupled into a fiber optic light guide. EP 1 284 428 A2 describes a coupling device by means of which waveguides comprising a transmitting and/or receiving diode can be coupled to each other. U.S. Pat. No. 4,737,008 A discloses a module comprising an optical connector for connecting an optical transmitter with an optical receiver unit, wherein the connector comprises a ferrule. U.S. Pat. No. 4,758,719 A also discloses an optical connector which comprises a sleeve nut. GB 2 233 787 A discloses a solution by means of which a laser emitter comprising a coupling means can be connected to a fiber optic light guide. When coupling the light into the light guide the distance from the light source and the angle of the fibers with respect to the light source play a major role. In this regard DE 10 2008 044 938 B4 proposes various embodiments for the ferrule in order to be able to provide a reproducible distance and reproducible angle to the light source. Even if the embodiments proposed therein result in a significant improvement for maintaining the desired distance and the desired angle to the light source the connection of the fiber optic light guide to the light source particularly in mass production is a major challenge. Due to vibrations occurring during the operation of a vehicle pure plug-in connectors in particular at the outside of the vehicle, as is the case with the illumination of running boards, are not effective, because they can become loose quickly. Thus, screw connections have to be used. To this end screws are used, through which the fiber optic light guide and the ferrule are inserted. As is obvious from DE 10 2008 044 938 B4 the ferrules used have substantially a cylindrical shape, so that the axial position of the ferrule cannot be clearly defined by the screw. In known connections the axial position is determined by a rubber, which annularly surrounds the fiber optic light guide and is pressed radially inwardly by screwing a sleeve nut onto the screw. Here, it is not possible to check whether the ferrule actually has the correct distance from the light source. Therefore, the fiber optic or rigid light guide has to be pressed toward the light source during the entire assembly process, to which end the assembly operator has to grasp permanently the fiber optic light guide with one hand, which complicates the assembly process because often there is only a very limited installation space available and the assembly operator cannot move away from the connection, for example, to pick up tools. In addition, there is a danger that the assembly operator damages the glass fibers by the pressing process because they are only in a small degree resistant to loads exerted by pressure, bending or torsion. In case of damage the entire fiber optic light guide has to be replaced with a new one. Consequently, the provision of the connection is time-consuming, error-prone and expensive.

The connection of the fiber optic light guide to the light source provided in the way described above is also not free from drawbacks. In particular, due to the forces and vibrations occurring during the operation of the vehicle the axial position of the fiber optic light guide with respect to the optical fiber can change, such that the fiber optic component is no longer supplied with light or is not supplied with light as desired. Since off-road vehicles and partly SUVs can be used away from paved roads, the connection between the fiber optic light guide and the light source is subjected to additional loads exerted by water, moisture, dust, mud and stone chip, which the known connections can withstand only to a limited extent.

Similar problems occur with rigid light guides, even if they are used for other applications. The following discussion substantially applies equally both to rigid and fiber optic light guides. Although the above discussed disadvantages occur particularly strongly in coupling of light emitted from a light source, similar disadvantages may occur even if the fiber optic light guide at the end facing away from the light source is connected to the fiber optic component not in a fixed manner but detachably and is used as an adapter.

SUMMARY

Thus, it is an object of the present invention to provide an apparatus for connecting a fiber optic or rigid light guide to a light source which compared to known connections can be assembled more easily and is also able to reliably withstand higher loads exerted in particular by water and moisture.

The apparatus according to the invention comprises a connecting element connectable to the light source, into which the ferrule can be inserted and which has a number of movable fastening portions, wherein the fastening portions are biased and cooperate with the contact surface when the ferrule is inserted into the connecting element, whereby a first retention force is applied to the contact surface, and a fixing element which is positionable such that it cooperates with the fastening portions so that a second retention force, which is greater than the first retention force, is applied to the contact surface.

According to the invention therefore a two-step fastening process is realized. In a first step, the ferrule is inserted into the connecting element, for example in that an assembly operator pushes the ferrule into the connecting element. The preferably radially biased fastening portions apply a first retention force to the contact surface of the ferrule, which positions the ferrule and thus the fiber optic light guide axially, without requiring the assembly operator to hold the ferrule or the fiber optic light guide. The fiber optic or rigid light guide is prefixed in the desired position relative to the light source. On the other hand, the ferrule can be removed from the connecting element if replacement becomes necessary. Neither for the insertion process nor for the removal process tools are necessary.

In a second step the fixing element is positioned so that it cooperates with the fastening portions, which as a result of the cooperation apply a second retention force to the contact surface of the ferrule, which is greater than the first retention force which is applied by the fastening portions due to their own biasing force. The magnitude of the second retention force is determined based on the loads to be expected, based on which the apparatus according to the invention is designed accordingly. The first retention force is increased by the fixing element to the amount of the second retention force, wherein the directions of action of the first and the second retention force are substantially equal. Consequently, the ferrule and the fiber optic or rigid light guide are now fixed in their final position relative to the light guide. Because of the prefixing the risk that the position relative to the light guide changes, is significantly reduced or completely eliminated. Since the assembly operator, in contrast to known connections, can leave hold of the light guide during the installation, the installation is facilitated because he can move away from the apparatus, for example, to pick up tools.

Preferably, the first retention force is so large that the fiber optic or rigid light guide can be inserted into and removed from the connecting element in a non-destructive manner. The first retention force is such that the own weight of the light guide and the ferrule can reliably be absorbed, such that it is ensured that their position relative to the light guide is not changed even if the assembly person does not hold the light guide and the ferrule. However, the first retention force is not so large that the assembly operator has to apply an excessive force in order to insert/remove the ferrule into/from the connecting element. The background to this is that it cannot be assumed that the assembly operator always grips the fiber optic light guide at the ferrule during the insertion and removal process. Consequently, it must be ensured that the forces required to this end do not result in a damage of the fibers of the fiber optic light guide, particularly if the assembly operator pulls at the fiber optic light guide at a certain distance from the ferrule. Consequently, by setting the first retention force according to the invention a reliable prefixing is ensured, wherein at the same time the likelihood of damage during the installation process is significantly reduced compared to known connections.

Preferably, the fixing element cooperates with the fastening portions such that the second retention force is so large that the fiber optic or rigid light guide cannot be removed non-destructively from the connecting element without removing the fixing element. As already stated above, the second retention force is such that the apparatus reliably withstands the loads occurring during operation, for example, of the vehicle, without any release of the connection. However, the loads that occur are typically so high that the second retention force has anyway to be set so large that the removal from the connecting element cannot take place without destruction without the fixing element having previously been removed. However, there are applications where the loads normally occurring are very small so that the second retention force may be so low that a non-destructive removal from the connecting element without previously removal of the fixing element would be possible. Examples include illuminations of aquaria where no dynamic loads and no vibrations occur. But even in this case it is advantageous to set the second retention force such that the fiber optic or rigid light guide cannot be removed from the connecting element non-destructively without previously removing the fixing element. This is advantageous in order to prevent that the connection is released, if one inadvertently gets caught by the fiber optic light guide. However, it may also be useful to set the second retention force so that the ferrule is released from the connecting element without destruction of the fiber optic light guide. The second retention force can be chosen so that the pulling force necessary for releasing the ferrule from the connecting element is slightly below the tensile strength of the fiber optic light guide. With this it is possible to protect the optical fiber from excessive loads and damages.

In an advantageous improvement the ferrule comprises one or more indentations extending from the contact surface, into which the fastening portions can be inserted. In the original state the ferrule has a cylindrical shape, so that the outer surface is free of an indentation. In this case the first and the second retention forces exerted by the fastening portions cause a frictional connection between the ferrule and the connecting element. However, in this improvement of the ferrule comprising indentations in addition to a frictional connection a form fit can be effected, such that the first and in particular the second retention force can be increased significantly in a structurally simple manner compared to the frictional connection, without having to increase the size of the fastening portions and the fixing element. Thus, the apparatus can withstand high loads while having a compact and material-saving design.

In a particularly preferred embodiment the fastening portions comprise first tapered surfaces and the ferrule comprises corresponding second tapered surfaces. The second tapered surfaces may be part of the indentation or can form the indentation of the ferrule. In this case, the second retention force is mainly determined by the angle of the tapered surfaces with respect to the longitudinal axis of the apparatus. At an angle of 0° no indentation is formed, so that the second retention force is minimized, while at an angle of 90° the second retention force is maximized.

In a further improvement of the apparatus the light source is arranged in a housing and the fixing element can be connected to the housing, wherein by means of the translational movement of the fixing element performed during the connection process the fastening portions are pressed against the contact surface. For the reason alone to protect the light source against external influences it is advantageous to arrange the light source in a housing. From a constructional point of view it is advantageous to configure the fixing element connectable to the housing, since no further structural measures have to be taken to position the fixing element. In this case the connection of the fixing element to the housing should require a translational movement of the fixing element relative to the housing, which, for example, is the case when the fixing element is slid onto a correspondingly shaped portion of the housing. This translational movement is converted, for example, by means of conical contact surfaces between the fixing element and the fastening portions into an at least partially radial movement of the fastening portions, which as a result are pressed against the contact surface of the ferrule, whereby the second retention force is generated. In the case that the ferrule has a taper it is ensured that the fastening portions are inserted into the taper and remain there. Thus, not only the fixing element is secured and positioned at the housing, but also the second retention force is generated.

Preferably the fixing element and the housing can be screwed together via a second threaded connection. Threaded connections are characterized by a high reliability, so that in this case, too, they represent the means of choice. In screwing together the fixing element and the housing the rotational movement of the fixing element is converted into a translational movement, such that the fastening portions are preferably moved radially inwardly. In this case the fixing element and the fastening portions can cooperate so that the fastening portions are pressed the more strongly onto the contact surface, the further the fixing element is screwed in. Consequently, in the present exemplary embodiment the second retention force can be adjusted via the screw-in depth. For example, by use of washers a stop can be provided in order to set the screw-in depth. Consequently, the second retention force can be adjusted and changed in a structurally simple manner. The more the fixing element is screwed in, the stronger the fastening portions are pressed onto the contact surface, so that the second retention force can be adjusted via the screw-in depth. For example, by use of washers a stop is provided to determine the screw-in depth.

Consequently, the second retention force can be adjusted and changed in a structurally simple manner. The apparatus according to the invention is improved by a sealing element for sealing the fiber optic or rigid light guide with respect to the apparatus. In particular for applications in which the apparatus is subjected to the impact of water and moisture, the sealing element provides for an effective protection of the apparatus and its components.

Advantageously, a sealing housing is connectable to the fixing element, which cooperates with the sealing element in such a way, that by means of the translational movement performed during the connecting process the sealing element is pressed against the fiber optic light guide and the sealing housing. In this case the connection of the sealing housing to the fixing element should require a translational movement of the fixing element relative to the sealing housing. This translational movement is converted, for example, by means of conical contact surfaces between the sealing housing and the sealing element into an at least partially radial movement of the sealing element, which consequently is pressed against the fiber optic light guide. As a result high contact pressures can be generated, so that a high degree of tightness can be provided. By means of the apparatus according to the invention a high level of protection in the sense of the IP classes (International Protection or Ingress Protection, for example in accordance with DIN EN 60529) can be provided.

Conveniently, the sealing housing and the fixing element can be screwed together via a threaded connection. Threaded connections are characterized by a high reliability, so that in this case, too, they represent the means of choice.

In a preferred embodiment of the apparatus according to the invention the light source comprises a number of LEDs which are arranged on a printed circuit board arranged in the housing. LEDs have a high efficiency while developing little heat. In particular in vehicles often only a 12 V power supply is available, such that the use of LEDs is obvious. Furthermore, LEDs require little installation space, so that the design freedom compared to conventional light sources is significantly increased.

In addition, it has proven to be practical, if the housing is constructed in two pieces and comprises a carrier part and a fastening part, which are connectable to one another, wherein the fastening part comprises a number of screw-in fittings, into which the fixing element can be screwed. The two-piece design has the advantage that the light source is accessible and can therefore be replaced if defect. In addition, the fastening part can be more easily be provided with the screw-in fitting than a one-piece housing. The screw-in fitting can be made integral with the fastening part, such as by injection molding, or be provided as a separate part, which, for example, is then bonded with the fastening part.

Preferably, the connecting element is connectable to the fastening part or formed integrally with the fastening part. Depending on the manufacturing method used, it makes sense to form the connecting element from the fastening part itself or to first manufacture the connecting element as a separate component and subsequently to connect it to the fastening element. Thus, it is possible to flexibly respond to the requirements placed on the connection according to the invention and to use a low-cost manufacturing processes.

Furthermore, the carrier part and the fastening part comprise positioning means for positioning the printed circuit board which cooperate with the printed circuit board when the carrier part and the fastening part are connected to each other. LEDs are usually soldered onto a printed circuit board. Consequently, it is necessary to position the printed circuit board in a reproducible manner within the housing, since deviations from the desired position of the light source are associated with the aforementioned negative consequences for the coupling of light into the fiber optic light guide. The positioning means ensure the correct positioning of the printed circuit board within the housing and relative to the fiber optic light guide. By means of the two-piece design of the housing, the printed circuit board can be easily inserted into the carrier part and finally fixed in position by connecting it to the fastening part.

Preferably, the screw-in fitting is arranged concentrically to the LED, when the carrier part and the fastening part are connected to each other. By means of this arrangement an optimal coupling of the light provided by the LED into the fiber optic light guide is ensured.

In this case, a number of sealing rings cooperating with the printed circuit board are provided, which surround the LEDs. As already explained, the LEDs are usually disposed on a printed circuit board, which in turn is disposed in the housing. As also explained, according to the invention it is possible to seal the apparatus with respect to the fiber optic light guide by means of a sealing element. Even if the LEDs are protected by the housing, the housing does not provide any reliable protection against water ingress, particularly if the housing is configured in two pieces. Consequently, the sealing rings cooperating with the printed circuit board provide for a housing side sealing of the LEDs and the apparatus according to the invention, respectively.

Preferably, the ferrule comprises an end face from which a recess extends into which the LED can be inserted. The end face can thus contact the printed circuit board so that a defined positioning of the ferrule relative to the printed circuit board is ensured, because the printed circuit board acts as an axial stop. When assembled, the ferrule is pressed with its end face onto the printed circuit board without play, so that its position is no longer changed. Despite of increasingly improved manufacturing processes the LED can be soldered only within certain tolerances to the printed circuit board, so that the position of the LED on the printed circuit board is subjected to small fluctuations. The recess is dimensioned such that by taking into account the tolerances the LED is always enclosed by the recess. This ensures that the LED is not damaged during the installation of the ferrule.

Another aspect of the invention relates to a system for connecting a fiber optic or rigid light guide to a light source, wherein one end of the fiber optic or rigid light guide is connected to a ferrule comprising a contact surface, comprising a housing in which the light source is arranged, a connecting element which is connectable to the housing or is formed integrally with the housing, wherein the ferrule can be inserted into the connecting element and the connecting element includes a number of radially movable fastening portions, wherein the fastening portions are radially biased and cooperate with the contact surface when the ferrule is inserted in the connecting element, whereby a first retention force is applied to the contact surface, and a fixing element which is positionable such that it cooperates with the fastening portions so that a second retention force is applied to the contact surface which is greater than the first retention force.

The technical effects and the advantages which can be achieved with the system according to the invention correspond to those which have been presented for the respective exemplary embodiments of the apparatus according to the invention. In particular, the possibility to connect the fiber optic light guide in two steps to the housing, should be pointed out. First, the fiber optic or rigid light guide is prepositioned without the need for tools. Subsequently, the position of the fiber optic or rigid light guide is determined definitively using the fixing element. In addition to the simplified assembly high axial forces can be transmitted, so that the optimal coupling of the light provided by the light source into the fiber optic light guide is ensured even at high loads.

Another aspect of the invention relates to a ferrule for connecting a fiber optic or rigid light guide to a light source by means of an apparatus or a system according to one of the previously presented embodiments, wherein the ferrule is connected to one end of the fiber optic or rigid light guide and has a contact surface, via which the ferrule cooperates with fastening portions of a connecting element of the apparatus or system, when the ferrule is inserted into the connection element, wherein said ferrule comprises one or more indentations extending from the contact surface, into which the fastening portions of the apparatus or the system can be inserted. Preferably, the ferrule comprises an end surface from which a recess extends, into which the light source, in particular a LED can be inserted.

The technical effects and the advantages which can be achieved with the ferrule according to the invention correspond to those which have been presented for the exemplary embodiments of the apparatus according to the invention relating to the ferrule. Known ferrules have a cylindrical shape so that the outer surface is free of indentations. In this case the first and second retention forces exerted by the fastening portions cause a frictional connection between the ferrule and the connecting element. However, in this improvement of the ferrule comprising indentations, in addition to the frictional connection a form fit can be achieved, whereby the first and in particular the second retention force can be increased significantly in a structurally simple way compared to the friction connection, without the need for increasing the size of the fastening portions and the fixing element. Thus, the apparatus can withstand high loads with a compact and material-saving design.

The object is further achieved by a method for connecting a fiber optic or rigid light guide to a light source, wherein one end of the fiber optic or rigid light guide is connected to a ferrule which comprises a contact surface, including the steps of: inserting the ferrule into a connecting element which is connectable to the light source and has a plurality of radially movable fastening portions, wherein the fastening portions are radially biased and cooperate with the contact surface, when the ferrule is inserted into the connecting element, whereby a first retention force is applied to the contact surface; and positioning a fixing element such that it cooperates with the fastening portions so that a second retention force is applied to the contact surface which is greater than the first retention force.

The technical effects and the advantages which can be achieved by the method according to the invention correspond to those which have been presented for the respective exemplary embodiments of the apparatus according to the invention. In particular, the possibility to connect the fiber optic light guide in two steps to the housing should be pointed out. First, the fiber optic or rigid light guide is prepositioned by inserting the ferrule into the connecting member without the need for tools. Subsequently, the position of the fiber optic or rigid light guide is set definitively by use of the fixing element. The assembly is thus simplified compared to known connections and scrap is reduced. In particular, according to the invention it is possible to release the connection without great expense both in the prepositioned and in the final state. In the prepositioned state, for example, a damaged fiber optic light guide can be replaced during the assembly in order to prevent the delivery of defective components. Moreover, fiber optic or rigid light guides damaged during the operation can be replaced later, to which end, however, the fixing element has to be removed.

Another aspect of the invention relates to the use of the apparatus, the system, the ferrule and the method for connecting a fiber optic or rigid light guide to a light source according to any of the previously described exemplary embodiments for applications in automotive engineering, shipping, aviation, industry, building technology and aquaristics. As mentioned earlier, off-road vehicles and SUVs are increasingly equipped with illuminated running boards, where the fiber optic light guide and the connection to the light source are subjected to high loads applied by water, moisture and dust. In shipping and aviation vessels and aircrafts can be illuminated in a specific way by use of fiber optic light guides and connected optical fiber components such as sidelights. There similar loads occur as in vehicles, wherein in the shipping industry often additional loads caused by salt contained in seawater occur. In aviation, additionally air pressure and temperature variations occur. In the industry it is conceivable to illuminate production lines which in particular in the chemical and metallurgical industry may be disposed in very harsh environments. Even buildings are subjected to high loads depending on the geographical location. Moreover, in the aquaristics applications are conceivable in which fiber optic components for providing light underwater are used.

DESCRIPTION OF THE DRAWINGS

Hereinafter the invention is explained in detail with reference to the accompanying drawings. In the drawings:

FIG. 2a) shows the system shown in FIG. 1 in a first pre-assembled state;

FIG. 2b) shows an enlarged detail of the system in a schematic diagram showing approximately the first pre-assembled state;

DETAILED DESCRIPTION

Figure 1:
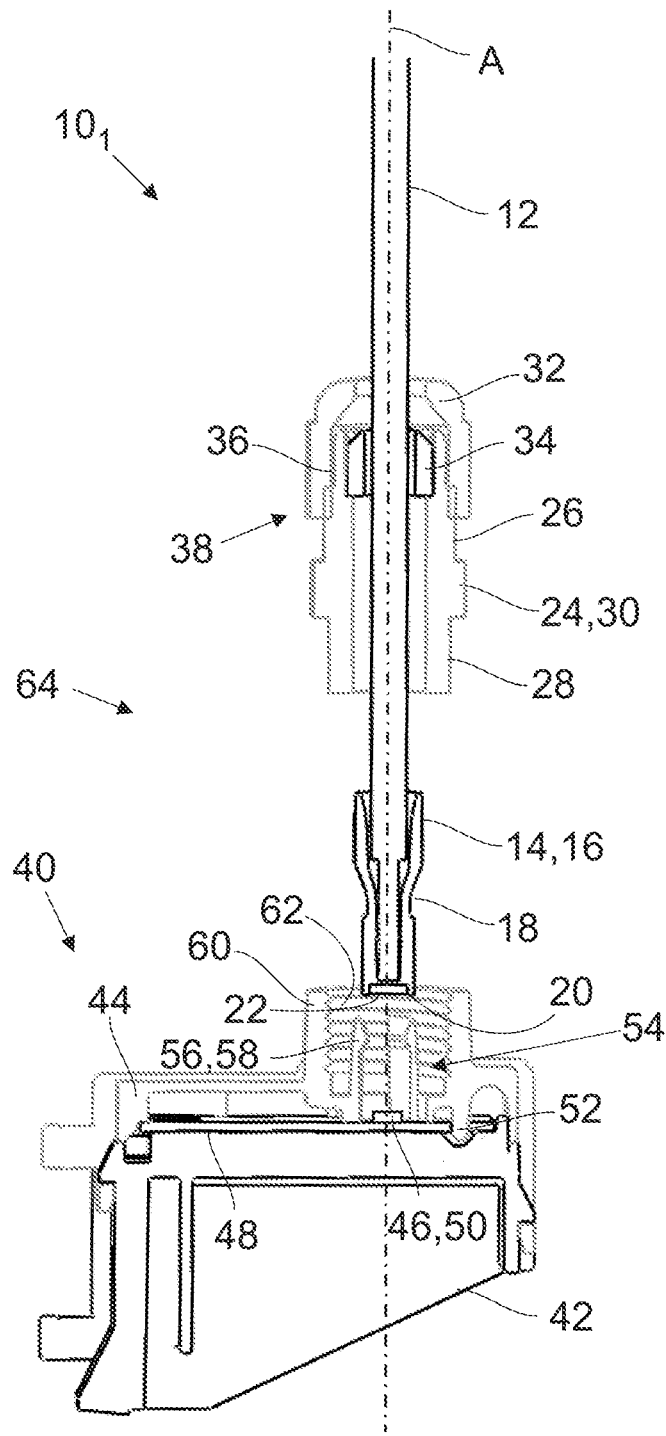
FIG. 1 shows a first exemplary embodiment of a system according to the invention for connecting a fiber optic or rigid light guide to a light source in a disassembled state.

FIG. 1 shows a cross sectional view of a first exemplary embodiment of the system $10_1$ according to the invention for connecting a fiber optic or rigid light guide to a light source in a disassembled state. The system $10_1$ comprises a fiber optic light guide 12, which is connected to a fiber optic component not shown in detail. Instead of the fiber optic light guide 12 also a rigid light guide 12 may be used. At one end the fiber optic light guide 12 is connected to a ferrule 14, for example by gluing. The ferrule 14 is substantially configured tubular and comprises a contact surface 16 which in the illustrated example corresponds to the outer surface of the ferrule 14. A continuous, annular indentation 18 extends from the contact surface 16. Furthermore, the ferrule 14 comprises an end face 20 from which a recess 22 extends.

Around the fiber optic light guide 12 a fixing element 24 is displaceably arranged, which in the illustrated example is formed as a tubular sleeve comprising a first and a second external thread portion 26, 28 which are separated by a radial extension 30. In the transition region of the radial extension 30 to the first and second external thread portions 26, 28 sealings (not shown) are arranged. Such fixing elements 24 are mass production components, which are used in cable screw connections by default.

Further, a sealing housing 32, in which a sealing element 34 is arranged, is slidably disposed about the fiber optic light guide 12. The seal housing 32 comprises an internal thread 36 which together with the fixing element 24 forms a first threaded connection 38, so that the sealing housing 32 can be screwed to the fixing element 24. In the state shown, the sealing housing 32 is screwed onto the first external thread portion 26 to such an extent that a reliable connection between the sealing housing 32 and the fixing element 24 is established.

Furthermore, the system $10_1$ comprises a two-piece housing 40 comprising a carrier part 42 and a fastening part 44. The carrier part 42 and the fastening part 44 are connectable to one another in a manner not shown in detail, for example by a snap connection. In the housing 40 a light source 46 is arranged, which in the example shown is configured as a LED 50 soldered onto a printed circuit board 48. The printed circuit board 48 is fixed in position by means of positioning means 52 which in the present case are configured as protrusions and recesses.

Furthermore, the system $10_1$ comprises a connecting member 54 which in this embodiment is formed integral with the fastening part 44 of the housing 40 and comprises three fastening portions 56 which in the region of their free ends 57 each comprise a protrusion 58 facing radially inwardly and disposed concentrically around a longitudinal axis A. Further a screw-in fitting 60 is formed integrally with the fastening part 44 and comprises an internal thread 62, which is also arranged concentrically about the longitudinal axis A.

The fixing element 24 and the connecting member 54 represent the essential components of an apparatus 64 according to the invention for connecting a fiber optic light guide 12 to a light source 46, which may be part of the system $10_1$, however, this need not necessarily be the case. In particular, the connecting element 54 may be connected to the light source 46 in another way than by means of a housing 40.

FIG. 2a) shows the system $10_1$ illustrated in FIG. 1 in a first pre-assembled state, while FIG. 2b) shows the ferrule 14 and the connecting element 54 on the basis of a schematic diagram which is not to scale and is significantly enlarged with respect to the version shown in the remaining figures. FIG. 2b) serves exclusively for a better understanding, wherein for the sake of clarity, a theoretical state is shown. After the fiber optic light guide 12 and the ferrule 14, the fixing element 24 and the sealing housing 32 have been positioned concentrically to the longitudinal axis A (see FIG. 1), the ferrule 14 is inserted into the connecting element 54 until the ferrule 14 with its end face 20 abuts on the printed circuit board 48. The fastening portions 56 comprise on their radial inside tapers 65 directed towards their free ends 57, so that the ferrule 14 can be inserted into the connecting element 54 in a simple manner. As seen from FIG. 2a), the protrusions 58 of the fastening portions 56 are arranged so that they engage into the indentation 18 of the ferrule 14 when the end face 20 rests on the printed circuit board 48. Since the fastening portions 56 are biased radially inwardly, the fastening portions 56 abut at the contact surface 14 in the indentation 18 in the area of the protrusions 58, and a first retention force is applied to the contact surface 16 which causes a prefixing of the ferrule 14 and consequently of the fiber optic light guide 12 in the position shown in FIG. 2a), in which the end face 20 abuts on the printed circuit board 48. The bias is selected so that no tool is necessary for the inserting the ferrule 14 into the connecting element 54. The first retention force is such that the own weight of the fiber optic light guide 12 and the components connected to it in the first pre-assembled state shown here causes no change in the position of the ferrule 14 and the fiber optic light guide 12. As can be seen in particular from FIG. 2b) the protrusions 58 comprise first tapered surfaces 66 and the indentation 18 comprises corresponding second tapered surfaces 69. This has the effect that the ferrule 14 and the fiber optic light guide 12 may be removed from the connecting element 54, for example when the fiber optic light guide 12 is to be replaced. In this case, the fastening portions 56 are pressed slightly radially outwards. The first retention force is selected such that the removal, too, is possible without tools.

Figure 3:
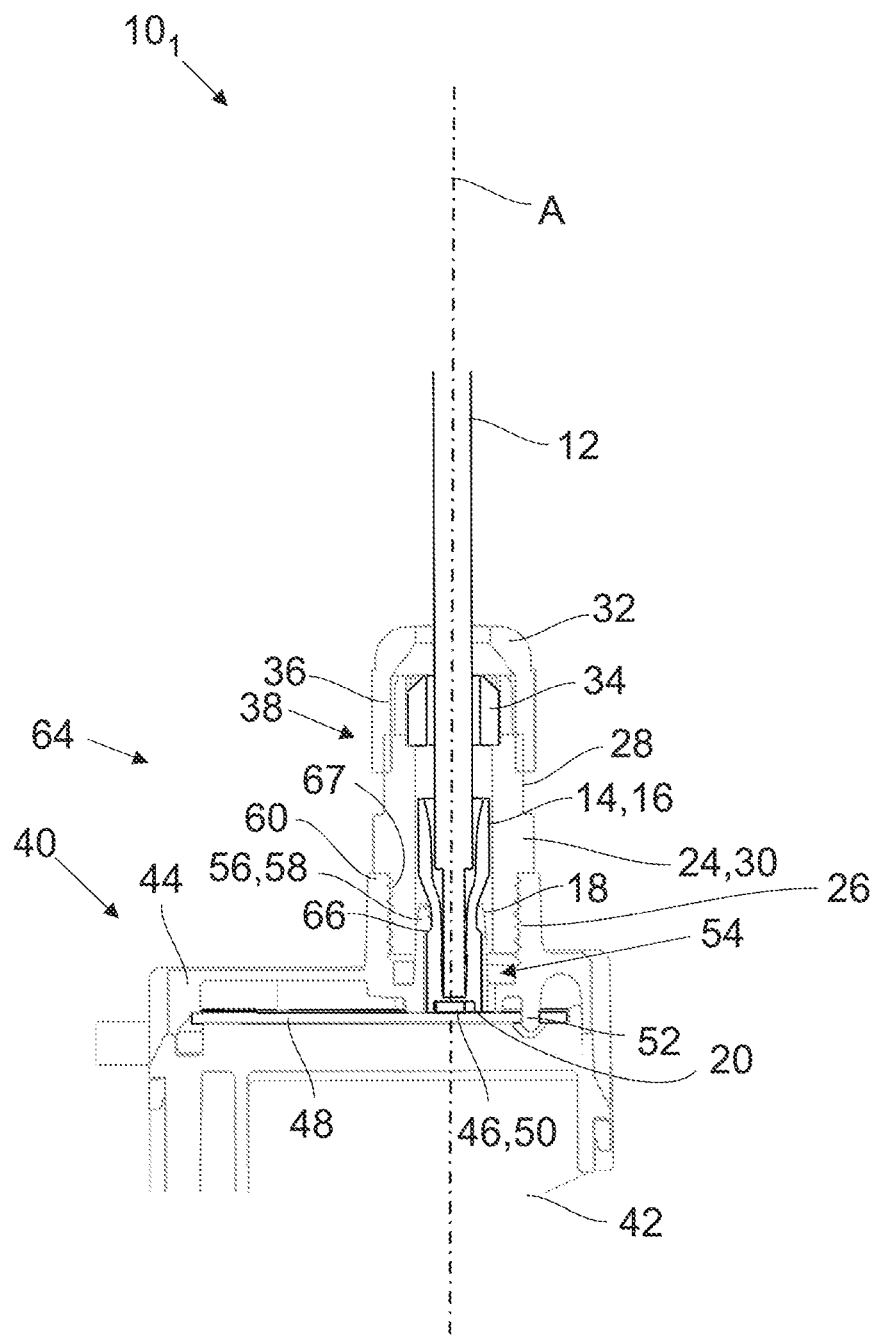
FIG. 3 shows the system illustrated in FIG. 1 in a second pre-assembled state.

FIG. 3 shows the system $10_1$ illustrated in FIG. 1 in a second pre-assembled state in which the fixing element 24 is screwed into the screw-in fitting 60, so that a second threaded connection 67 is formed between the fixing element 24 and the housing 40. As already explained above, the fixing element 24 comprises a first and a second external thread portion 26, 28 which are separated by a radial extension 30. The fixing element 24 is screwed in by means of the first external thread portion 26 until the radial extension 30 abuts against the screw-in fitting 60. Since now also the corresponding sealing (not illustrated) abuts against the screw-in fitting 60 it is ensured that no moisture can penetrate via the second threaded connection 67. Herein, the fixing element 24 contacts the fastening portions 56 so that they are pressed radially inwardly onto the contact surface 16, such that a second retention force acts which is greater than the first retention force. In particular, the contact between the fixing element 24 and the fastening portions 56 prevents the latter from being moved radially outwardly, when axially forces directed away from the light source 46 act on the fiber optic light guide 12 and the ferrule 14. The second retention force is selected such that all loads occurring during the operation of the system $10_1$ can reliably be absorbed. In order to remove the fiber optic light guide 12 from the light source 46 in a non-destructive manner, first the fixing element 24 has to be removed.

Figure 4:
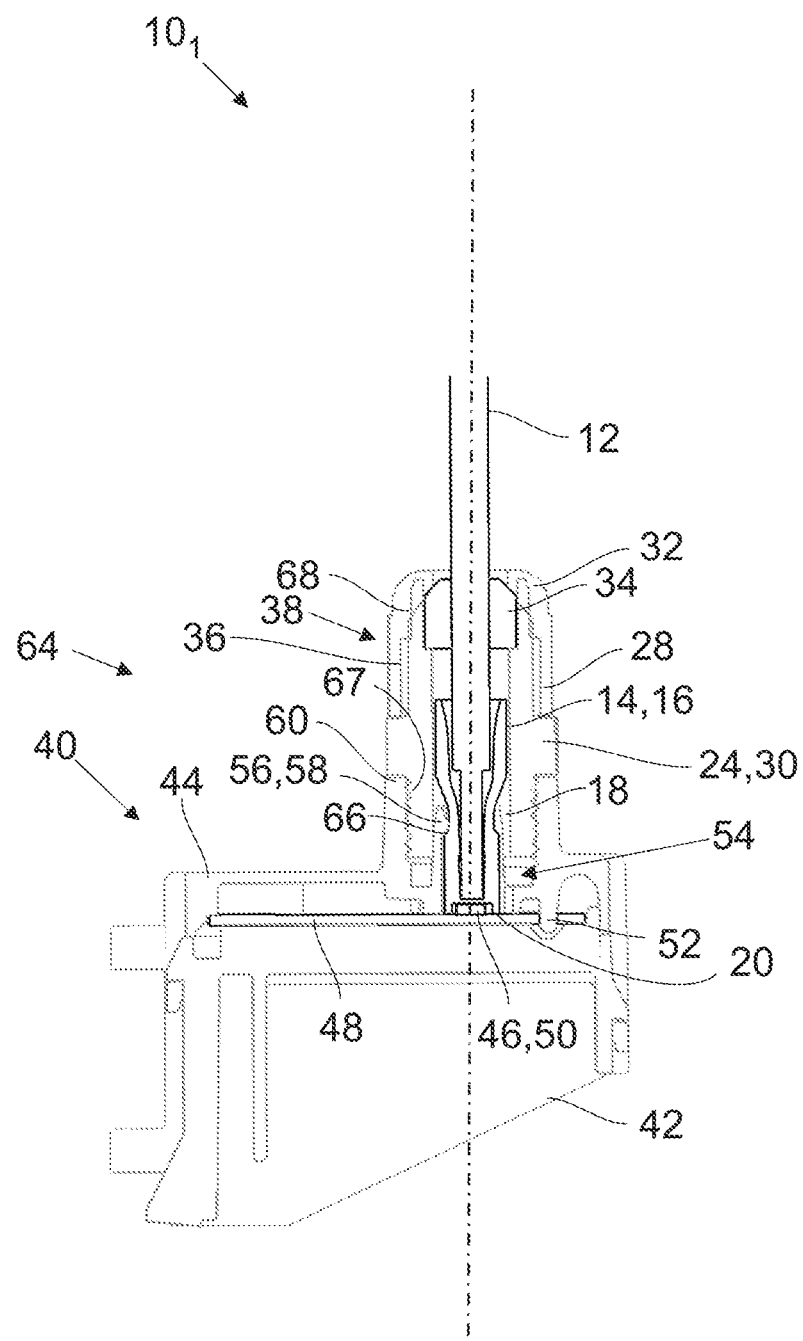
FIG. 4 shows a cross sectional view of the system shown in FIG. 1 in a fully assembled state.

FIG. 4 shows the system $10_1$ illustrated in FIG. 1 in a fully assembled state. The sealing housing 32 is now fully screwed onto the second external thread portion 28 of the fixing element 24 so that it abuts against the radial extension 30. Since now also the corresponding sealing (not shown) abuts against the sealing housing 32 it is ensured that no moisture can penetrate via the first threaded connection 38. The sealing housing 32 and the sealing member 34 have mutually corresponding conical contact surfaces 68, so that the sealing element 34 during screwing of the sealing housing 32 is moved radially inwardly and pressed onto the fiber optic light guide 12. Herein, the ferrule 14 is pressed via its end face 20 onto the printed circuit board 48 without play. The system 101 is now sealed and ready for operation on the part of the fiber optic light guide 12.

Figure 5:
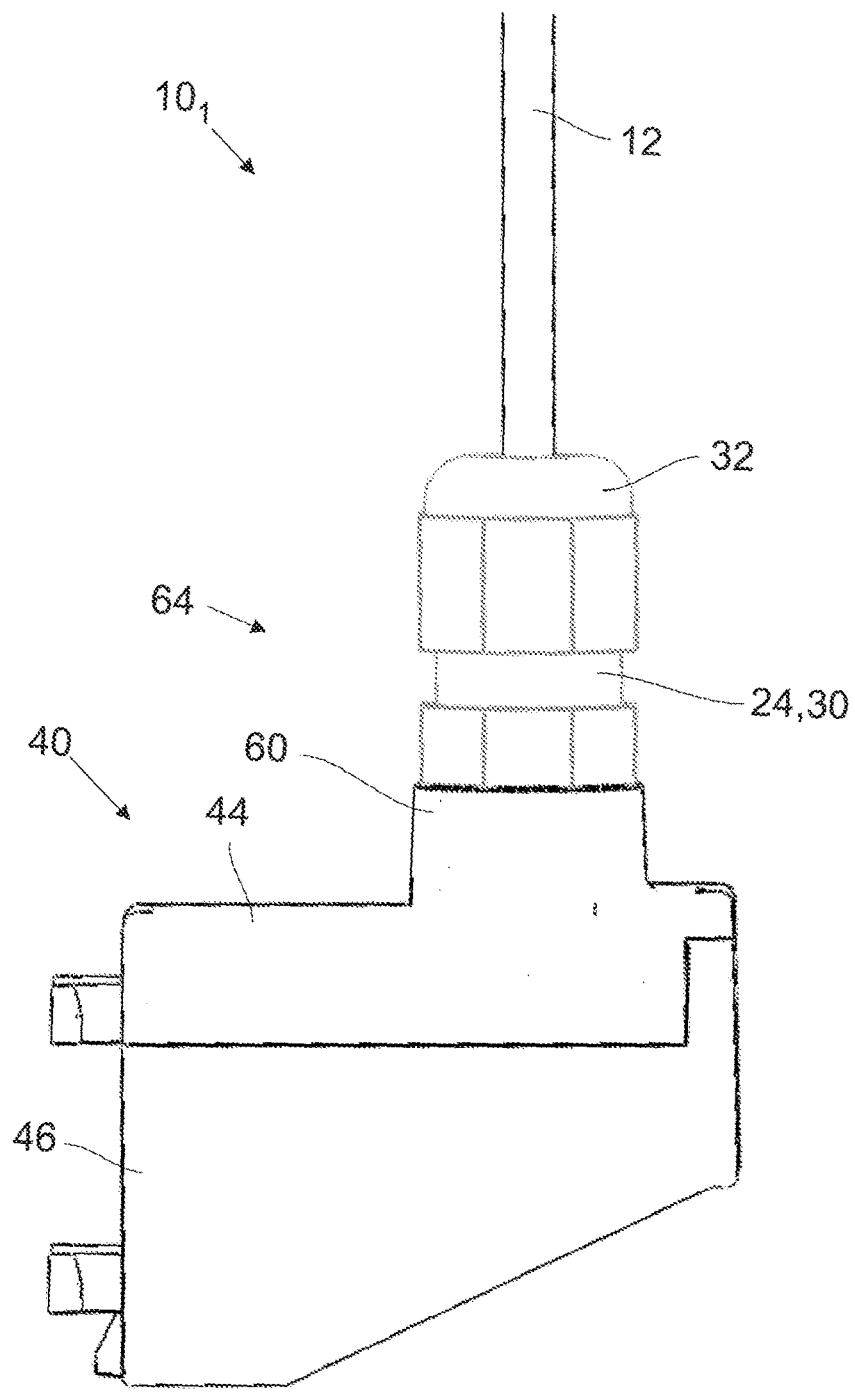
FIG. 5 shows a side view of the system shown in FIG. 1 in a fully assembled state.

FIG. 5 shows a perspective view of the system $10_1$ illustrated in FIG. 4 in a fully assembled state.

Figure 6:
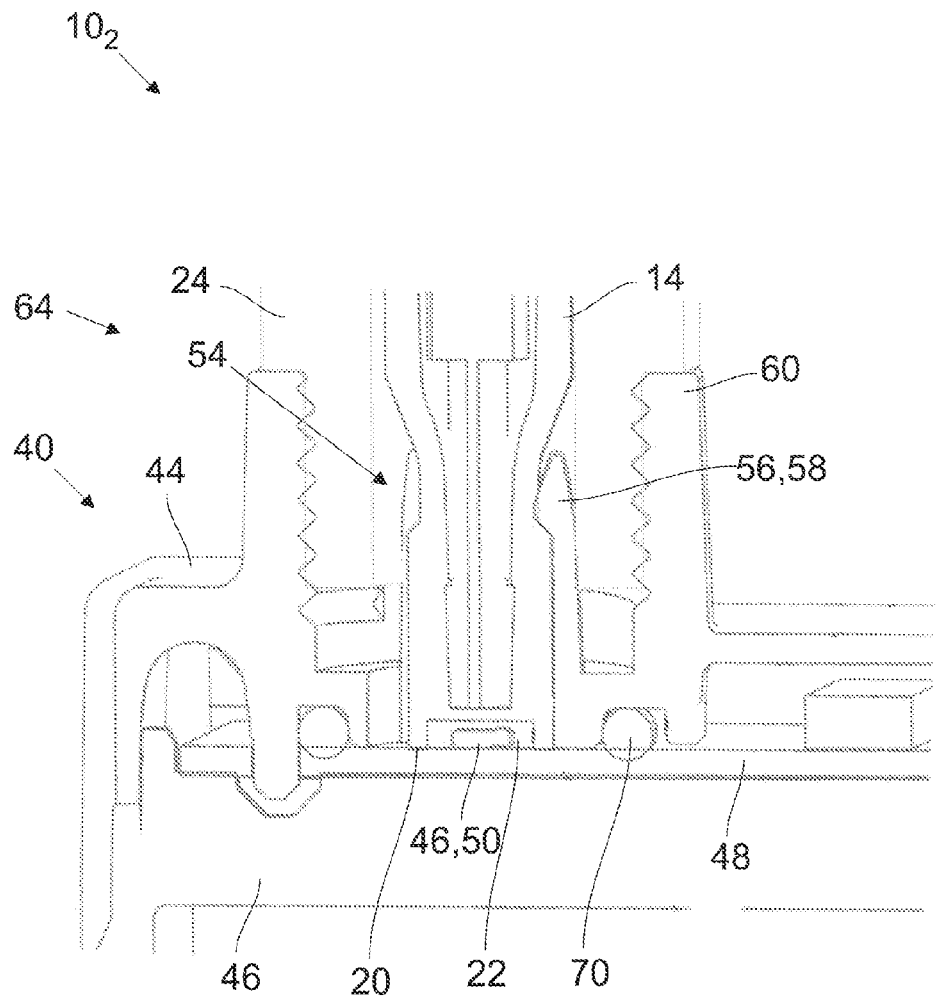
FIG. 6 shows a fragmentary sectional view of a second exemplary embodiment of a system according to the invention for connecting a fiber optic or rigid light guide to a light source in a fully assembled state.

FIG. 6 shows a second exemplary embodiment of the system $10_2$ according to the invention in a partial sectional view. The second exemplary embodiment differs from the first exemplary embodiment substantially in that a sealing ring 70 is disposed between the printed circuit board 48 and the fastening part 44 of the housing 40 so that the light source 46 configured as a LED 50 is sealed against moisture and water even by means of the housing 40.

At this point it should be noted that the apparatus 64 according to the invention and the system 10 according to the invention can not only be used for connecting the fiber optic light guide to a light source 46, but also for releasably connecting the fiber optic light guide to an optical component which is to be supplied with light. In this case the fiber optic light guide can be equipped at both ends with the apparatus according to the invention and be configured as an adapter.

LIST OF REFERENCE NUMBERS

| | |
|---|---|
| 10, $10_1$, $10_2$ | system |
| 12 | light guide |
| 14 | ferrule |
| 16 | contact surface |
| 18 | indentation |
| 20 | end face |
| 22 | recess |
| 24 | fixing element |
| 26 | first external thread portion |
| 28 | second external thread portion |
| 30 | radial extension |
| 32 | sealing housing |
| 34 | sealing element |
| 36 | internal thread |
| 38 | first threaded connection |
| 40 | housing |

LIST OF REFERENCE NUMBERS -continued

| | |
|---|---|
| 42 | carrier part |
| 44 | fastening part |
| 46 | light source |
| 48 | printed circuit board |
| 50 | LED |
| 52 | positioning means |
| 54 | connecting element |
| 56 | fastening portion |
| 57 | free end |
| 58 | protrusion |
| 60 | screw-in fitting |
| 62 | internal thread |
| 64 | apparatus |
| 65 | taper |
| 66 | first tapered surfaces |
| 67 | second threaded connection |
| 68 | conical contact surfaces |
| 69 | second tapered surfaces |
| 70 | sealing ring |
| A | longitudinal axis |

What is claimed is:

1. An apparatus for connecting a fiber optic or rigid light guide to a light source, wherein one end of the fiber optic or rigid light guide is connected to a ferrule having a contact surface, the apparatus comprising:
   a connecting element that is connectable to the light source and can be inserted into the ferrule, the connecting element comprising a number of radially movable fastening portions, wherein the number of radially movable fastening portions are radially biased and cooperate with the contact surface when the ferrule is inserted into the connecting element to apply a first retention force to the contact surface; and
   a fixing element that can be positioned to cooperate with the number of radially movable fastening portions so that a second retention force, which is greater than the first retention force, is applied to the contact surface.

2. The apparatus according to claim 1, wherein the first retention force is so large that the fiber optic or rigid light guide can be inserted into and removed from the connecting element non-destructively.

3. The apparatus according to claim 2, wherein the fixing element cooperates with the number of radially movable fastening portions so that the second retention force is so large that the fiber optic or rigid light guide can no longer be removed from the connecting element non-destructively without removal of the fixing element.

4. The apparatus according to claim 1, wherein the ferrule comprises one or more indentations extending from the contact surface, the one or more indentations being configured to receive the number of radially movable fastening portions inserted therein.

5. The apparatus according to claim 4, wherein the number of radially movable fastening portions comprise first tapered surfaces and the ferrule comprises corresponding second tapered surfaces.

6. The apparatus according to claim 1, further comprising a housing connected to the fixing element, the light source being disposed in the housing, wherein translational movement of the fixing element and the connecting element with respect to one another presses the number of radially movable fastening portions against the contact surface.

7. The apparatus according to claim 6, wherein the fixing element is connected to the housing via a threaded connection.

8. The apparatus according to claim 6, further comprising a sealing element for sealing the fiber optic or rigid light guide with respect to the connecting element or the fixing element.

9. The apparatus according to claim 8, wherein the fixing element is connectable to a sealing housing, the sealing housing cooperating with the sealing element so that the translational movement presses the sealing element against the fiber optic or rigid light guide.

10. The apparatus according to claim 9, wherein the sealing housing is connected to the fixing element via a threaded connection.

11. The apparatus according to claim 6, wherein the light source comprises a number of LEDs are arranged on a printed circuit board.

12. The apparatus according to claim 11, wherein the housing is formed in two pieces and comprises a carrier part and a fastening part that are connectable to each other, wherein the fastening part has a number of screw-in fittings into which the fixing element can be screwed.

13. The apparatus according to claim 12, wherein the connecting element can be connected to the fastening part or is formed integrally with the fastening part.

14. The apparatus according to claim 12, wherein the carrier part and/or the fastening part comprise a positioning device configured to position the printed circuit board when the carrier part and the fastening part are connected to each other.

15. The apparatus according to claim 14, wherein the number of screw-in fitting are arranged concentrically to the number of LEDs when the carrier part and the fastening part are connected to each other.

16. The apparatus according to claim 15, further comprising a number of sealing rings cooperating with the printed circuit board, the sealing rings surrounding the number of LEDs.

17. The apparatus according to claim 11, wherein the ferrule comprises an end face from which a recess extends, into which the number of LEDs can be inserted.

18. A system for connecting a fiber optic or rigid light guide comprising a light source, wherein one end of the fiber optic or rigid light guide is connected to a ferrule having a contact surface, the system comprising:
   a housing in which the light source is arrangeable;
   a connecting element that is connected to the housing or is formed integral with the housing, wherein the ferrule can be inserted into the connecting element and the connecting element comprises a number of radially movable fastening portions, wherein the number of radially movable fastening portions are radially biased and cooperate with the contact surface when the ferrule is inserted into the connecting element to apply a first retention force to the contact surface; and
   a fixing element which is positionable such that it cooperates with the fastening portions so that a second retention force is applied to the contact surface, the second retention force being greater than the first retention force.

* * * * *